(No Model.)
G. S. HERRICK.
KNOB ATTACHMENT.
No. 363,743. Patented May 24, 1887.
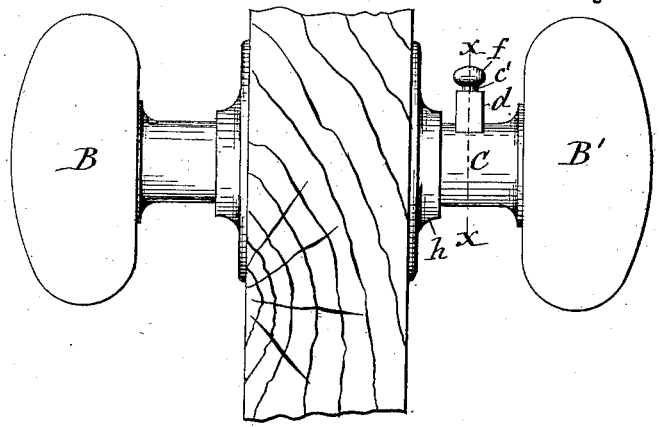
Fig. 1
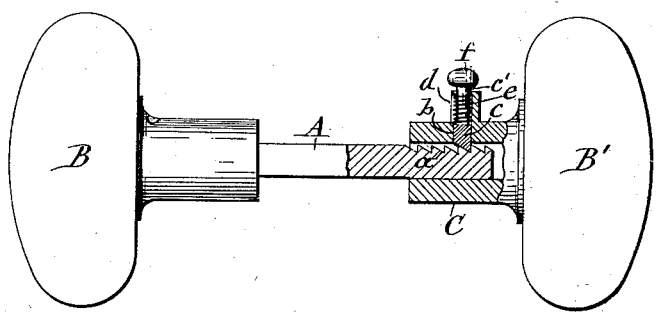
Fig. 2
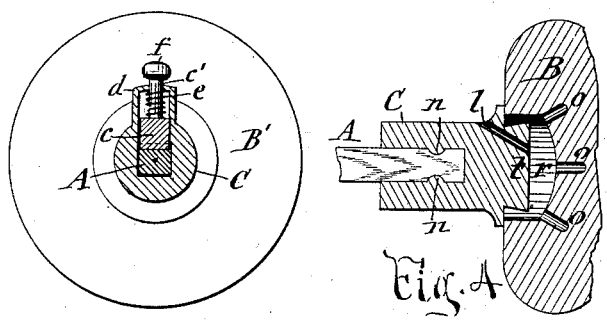
Fig. 3
Fig. 4
WITNESSES:
C. Bendixon
H. P. Donison
INVENTOR
George S. Herrick
BY
Hull, Laass & Hull
ATTORNEYS

UNITED STATES PATENT OFFICE.

GEORGE S. HERRICK, OF SYRACUSE, NEW YORK, ASSIGNOR OF ONE-HALF TO CHARLES P. HERRICK, OF SAME PLACE.

KNOB ATTACHMENT.

SPECIFICATION forming part of Letters Patent No. 363,743, dated May 24, 1887.

Application filed March 3, 1887. Serial No. 229,496. (No model.)

*To all whom it may concern:*

Be it known that I, GEORGE S. HERRICK, of Syracuse, in the county of Onondaga, in the State of New York, have invented new and useful Improvements in Knob Attachments, of which the following, taken in connection with the accompanying drawings, is a full, clear, and exact description.

This invention relates to the attachment of the knobs on the spindle of a door-lock.

It is a well-known fact that the ordinary means of detachably connecting a knob to the spindle by a screw passing transversely through the shank of the knob and into one of a series of holes in the spindle is defective, owing to the liability of the screw working loose and releasing the knob from the spindle and the weakening of the spindle by the perforations thereof, and also the necessity of introducing washers between the escutcheon and shank of the knob to adjust the latter to the thickness of the door.

Various devices have been resorted to for the purpose of obviating the aforesaid defects, but they have failed to come into extensive use for various reasons. They were either too expensive to manufacture or objectionable in their construction and operation. These objections are sought to be overcome by my present invention; and to that end it consists in the novel construction and combination of parts, as hereinafter fully described, and specifically set forth in the claim.

In the annexed drawings, Figure 1 is an edge view of a door provided with my improved knob attachment. Fig. 2 is a detached side view of the knob attachment, shown partly in longitudinal section to illustrate the attachment of the removable knob. Fig. 3 is a transverse section on line $x\,x$, Fig. 1; and Fig. 4 is a longitudinal section of the permanent attachment of the knob.

Similar letters of reference indicate corresponding parts.

A represents the spindle; B, the knob, which is permanently attached to one end of said spindle; and B' denotes the removable knob, the attachment of which latter I make as follows: I form the spindle A with a ratchet, $a$, along its side, the teeth of said ratchet facing toward the fixed knob B, as shown in Fig. 2 of the drawings. The shank C of the knob B', I provide with a radial mortise or channel, $b$, which extends through the side of said shank. In the channel $b$, I fit a longitudinally-sliding dog or pawl, $c$, which is adapted to engage the ratchet $a$. Over the outer end of the channel $b$ is a housing or socket, $d$, secured to the shank C, and through this housing is extended a stem $c'$, projecting from the dog $c$. A spiral spring, $e$, surrounds the stem $c'$ in the housing $d$ and serves to press the dog inward and into engagement with the ratchet $a$. A button or thumb-piece, $f$, on the outer end of the stem $c'$, resting on the exterior of the housing when the knob B' is removed from the spindle, limits the inward movement of the dog, and also serves as a means by which to draw the dog out of engagement with the ratchet when desired to remove the knob for repairs or renewal of the same.

By my invention the knob B' is readily attached to the spindle A by simply entering the spindle into the shank C, and while pressing the knob B toward the door pushing the knob B' on the spindle until the shank of said knob is brought to bear against the escutcheon $h$ on the door.

The dog $a$ automatically springs into engagement with the ratchet and retains the knob in its position on the spindle.

The permanent attachment of the knob B to the spindle A, I prefer to make in the following manner: I provide the knob (composed of mineral) with a recess, $r$, and with divergent cells $o\,o$ intersecting said recess, and the shank C, I form with a dovetailed tenon, $t$, somewhat smaller than the recess $r$, into which I insert said tenon. From the side of the shank C, diagonally through the same and through the tenon $t$, I drill a hole, $l$, and through this I pour molten lead while holding the tenon in the recess $r$. The lead filling said recess and the cells $o\,o\,o$ effectually locks the knob on the shank. I also permanently attach said shank to the spindle A by placing the end of the latter into the mold and casting the shank on the inclosed end of the spindle. To insure the hold of the shank on the spindle, I provide the latter with notches $n\,n$, the metal of which the shank is formed filling said notches, as represented in Fig. 4 of the drawings.

Having described my invention, what I claim as new, and desire to secure by Letters Patent, is—

The combination of the spindle A, formed with the ratchet $a$ on its side, the shank C, provided with the radial channel $b$, and housing $d$ over said channel, the dog $c$, sliding in the channel $b$, and having the stem $c'$, extending through the housing, and provided with the button $f$, and the spring $e$, surrounding the stem $c'$ in the housing, all constructed and combined substantially in the manner described and shown.

In testimony whereof I have hereunto signed my name and affixed my seal, in the presence of two attesting witnesses, at Syracuse, in the county of Onondaga, in the State of New York, this 28th day of February, 1887.

GEORGE S. HERRICK. [L. S.]

Witnesses:
C. BENDIXON,
H. P. DENISON.